United States Patent
Voto et al.

(10) Patent No.: US 7,917,081 B2
(45) Date of Patent: Mar. 29, 2011

(54) APPARATUS AND METHOD FOR VEHICLE SYSTEM INTERFACE

(75) Inventors: Robert M. Voto, Clarkston, MI (US); Joseph A. Damato, Lake Orion, MI (US); Massimo Baldini, Beverly Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 790 days.

(21) Appl. No.: 11/945,599

(22) Filed: Nov. 27, 2007

(65) Prior Publication Data
US 2009/0010448 A1 Jan. 8, 2009

Related U.S. Application Data

(60) Provisional application No. 60/867,568, filed on Nov. 28, 2006.

(51) Int. Cl.
*H04H 20/71* (2008.01)
*H04H 40/00* (2008.01)
(52) U.S. Cl. ............... 455/3.02; 455/3.01; 455/3.06; 455/90.3; 455/556.1
(58) Field of Classification Search .......... 455/3.01, 455/3.02, 3.06, 41.2, 41.3, 550.1, 446.1, 455/575.9, 90.3, 569.2, 556.1
See application file for complete search history.

(56) References Cited

U.S. PATENT DOCUMENTS

| | | | | |
|---|---|---|---|---|
| 6,272,328 B1 * | 8/2001 | Nguyen et al. | ............ | 455/277.1 |
| 6,396,164 B1 * | 5/2002 | Barnea et al. | ............ | 307/10.1 |
| 6,493,546 B2 * | 12/2002 | Patsiokas | ............ | 455/277.1 |
| 7,260,356 B2 * | 8/2007 | Helstrom et al. | ............ | 455/3.02 |
| 7,773,938 B2 * | 8/2010 | Voto | ............ | 455/3.02 |

* cited by examiner

*Primary Examiner* — Sonny Trinh
(74) *Attorney, Agent, or Firm* — Thomas N. Twomey

(57) ABSTRACT

A vehicle system interface, comprising: an antenna for receiving satellite or terrestrial broadcast of digital radio signals; a radio receiver circuit for demodulating and decoding the digital radio signals; a FM audio modulator and transmitter circuit, the FM audio modulator and transmitter circuit being configured to condition and re-transmit audio content of the digital radio signals as a first re-transmitted FM signal containing audio data capable of being transmitted wirelessly; a vehicle bus interface circuit configured to receive and transmit a plurality of operational signals; a housing for the FM audio modulator and transmitter circuit, the radio receiver circuit and the vehicle bus interface; a connector configured to interface with a diagnostic link connector of the vehicle, the connector being in operable communication with the vehicle bus interface circuit; and wherein the vehicle system interface receives and transmits the plurality of operational signals through the diagnostic link connector of the vehicle.

17 Claims, 6 Drawing Sheets

APPARATUS AND METHOD FOR VEHICLE SYSTEM INTERFACE

CROSS REFERENCE TO RELATED APPLICATIONS

This application claims the benefit of U.S. Provisional Patent Application Ser. No. 60/867,568 filed Nov. 28, 2006, the contents of which are incorporated herein by reference thereto.

BACKGROUND

This present invention relates generally to methods and apparatus for interfacing an aftermarket infotainment device to a vehicle. The present invention relates to an apparatus and method for providing an interface to the vehicle's systems, controls and displays for use with non-factory installed consumer products.

Digital broadcast media or information services such as the satellite digital audio radio service (SDARS), HD radio, or DVB provides subscribers with high quality media services, even in mobile environments like the automobile. These systems use satellite(s) or terrestrial broadcast towers to broadcast audio and advanced multimedia programs. The broadcasts can be received directly by subscriber receivers at home, at business locations, or in mobile vehicles. The satellite broadcasts will also be received and retransmitted by terrestrial repeaters to provide improved coverage and availability.

In one application, a factory installed satellite radio system allows a system integration of all of the necessary controls and displays of the vehicle. However, such a system lacks the flexibility of being able to move the satellite radio to another vehicle, change the content provider, or otherwise expand the system capability.

In other applications, and when there is no factory installed satellite radio system, the consumer may purchase an aftermarket system, which has its own built in displays and controls and is removable from the vehicle. As such, the aftermarket system will not be integrated into the existing vehicle system, typically connecting only via the cigarette lighter for power and transmitting audio on an FM radio frequency. Accordingly and when this aftermarket system is installed, the vehicle owner will have two sets of controls one for the factory installed system (e.g., CD player, AM/FM radio, cassette player, etc.) and one for the aftermarket system (e.g., satellite radio, MP3 player, I-Pod, navigation system (GPS), etc.).

Accordingly, it is desirable to provide a device that can access the existing vehicle displays, controls and systems in order to integrate an aftermarket or non-factory installed device without requiring a second set of independent controls and displays.

SUMMARY

Disclosed herein is an interface device for integrating an aftermarket audio device to an existing vehicle system. In one exemplary embodiment the interface device comprises: an antenna for receiving satellite or terrestrial broadcast of digital radio signals; a radio receiver circuit for demodulating and decoding the digital radio signals; a FM audio modulator and transmitter circuit, the FM audio modulator and transmitter circuit being configured to condition and re-transmit audio content of the digital radio signals as a first re-transmitted FM signal containing audio data capable of being transmitted wirelessly; a vehicle bus interface circuit configured to receive and transmit a plurality of operational signals; a housing for the FM audio modulator and transmitter circuit, the radio receiver circuit and the vehicle bus interface; a connector configured to interface with a diagnostic link connector of the vehicle, the connector being in operable communication with the vehicle bus interface circuit; and wherein the vehicle system interface receives and transmits the plurality of operational signals through the diagnostic link connector of the vehicle.

In another exemplary embodiment, a system for providing an interface to an existing vehicle audio system is provided. The system comprising: an audio device of the vehicle, the audio device comprising a FM tuner, a FM antenna and a display device; user accessible input device(s) for providing control signals to the audio device via a vehicle communication bus; a vehicle system interface configured to be coupled to the vehicle communication bus via a diagnostic link connector of the vehicle, the vehicle system interface comprising: an antenna to receive a digital radio signal; a radio receiver circuit for receiving the satellite digital radio signal of the antenna; a FM audio modulator and transmitter circuit, the FM audio modulator and transmitter circuit being configured to condition and re-transmit the digital radio signal as a first re-transmitted FM signal containing audio data capable of being transmitted wirelessly; a vehicle bus interface circuit configured to receive and transmit a plurality of operational signals; a housing for the FM audio modulator and transmitter circuit, the satellite radio receiver circuit and the vehicle bus interface; and a connector configured to interface with the diagnostic link connector of the vehicle, the connector being in operable communication with the vehicle bus interface circuit.

In another exemplary embodiment, a method for providing an interface to a vehicle audio system is provided. The method comprising: coupling a vehicle system interface to a diagnostic link connector of the vehicle, the vehicle system interface comprising: an antenna being configured to receive a digital radio signal; a radio receiver circuit for receiving the digital radio signal of the antenna; a FM audio modulator and transmitter circuit, the FM audio modulator and transmitter circuit being configured to condition and re-transmit the satellite digital radio signal as a first re-transmitted FM signal containing audio data capable of being transmitted wirelessly; a vehicle bus interface circuit configured to receive and transmit a plurality of operational signals; a housing for the FM audio modulator and transmitter circuit, the satellite radio receiver circuit and the vehicle bus interface; a connector configured to interface with the diagnostic link connector of the vehicle, the connector being in operable communication with the vehicle bus interface circuit; and receiving control signals from a vehicle communication bus, the control signals being generated by a user accessible input device; determining if the control signals are applicable to the operation of the vehicle system interface; manipulating an operational configuration of the vehicle system interface if the control signals are applicable to the operation of the vehicle system interface; transmitting output signals and data to the vehicle communication bus via the connector, wherein the output signals and data correspond to an operational state of the vehicle system interface; and transmitting the first re-transmitted FM signal containing audio data to an antenna of a radio of the vehicle.

The above-described and other features of the present disclosure will be appreciated and understood by those skilled in the art from the following detailed description, drawings, and appended claims.

DRAWINGS

DESCRIPTION OF EXEMPLARY EMBODIMENTS

Figure 1:
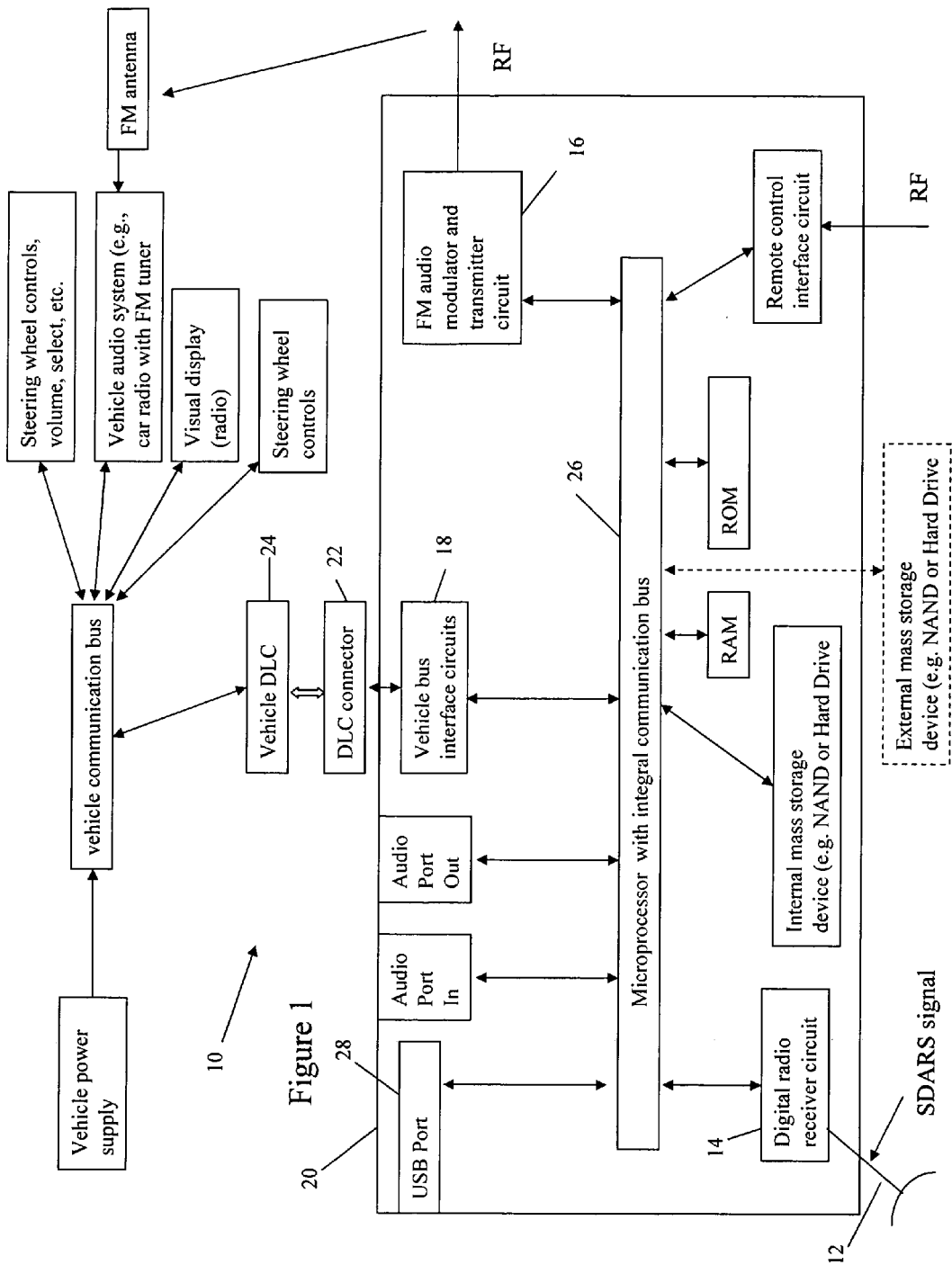
FIG. 1 is a schematic illustration of an exemplary embodiment of the present invention.
Figure 2:
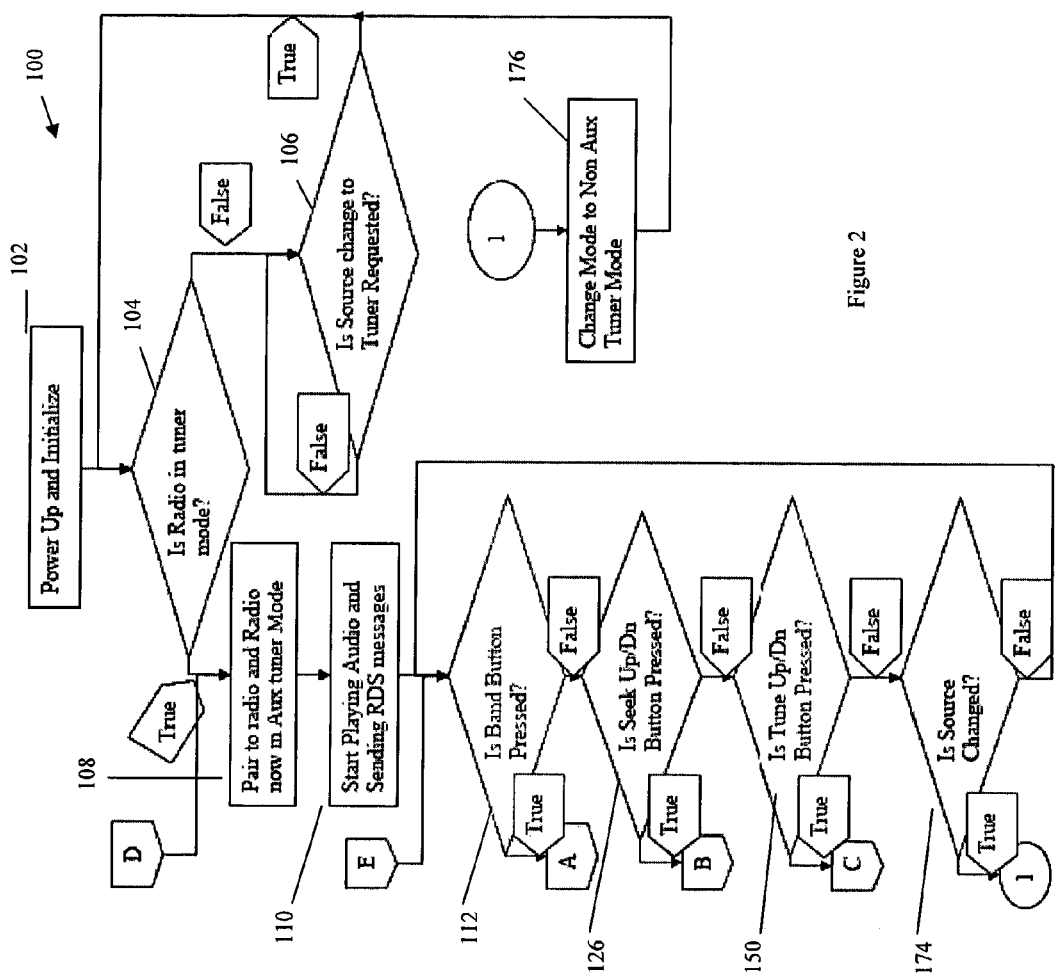
FIGS. 2-5 illustrate a flow chart of portions of a control algorithm for executing an exemplary embodiment of the present invention.
Figure 3:
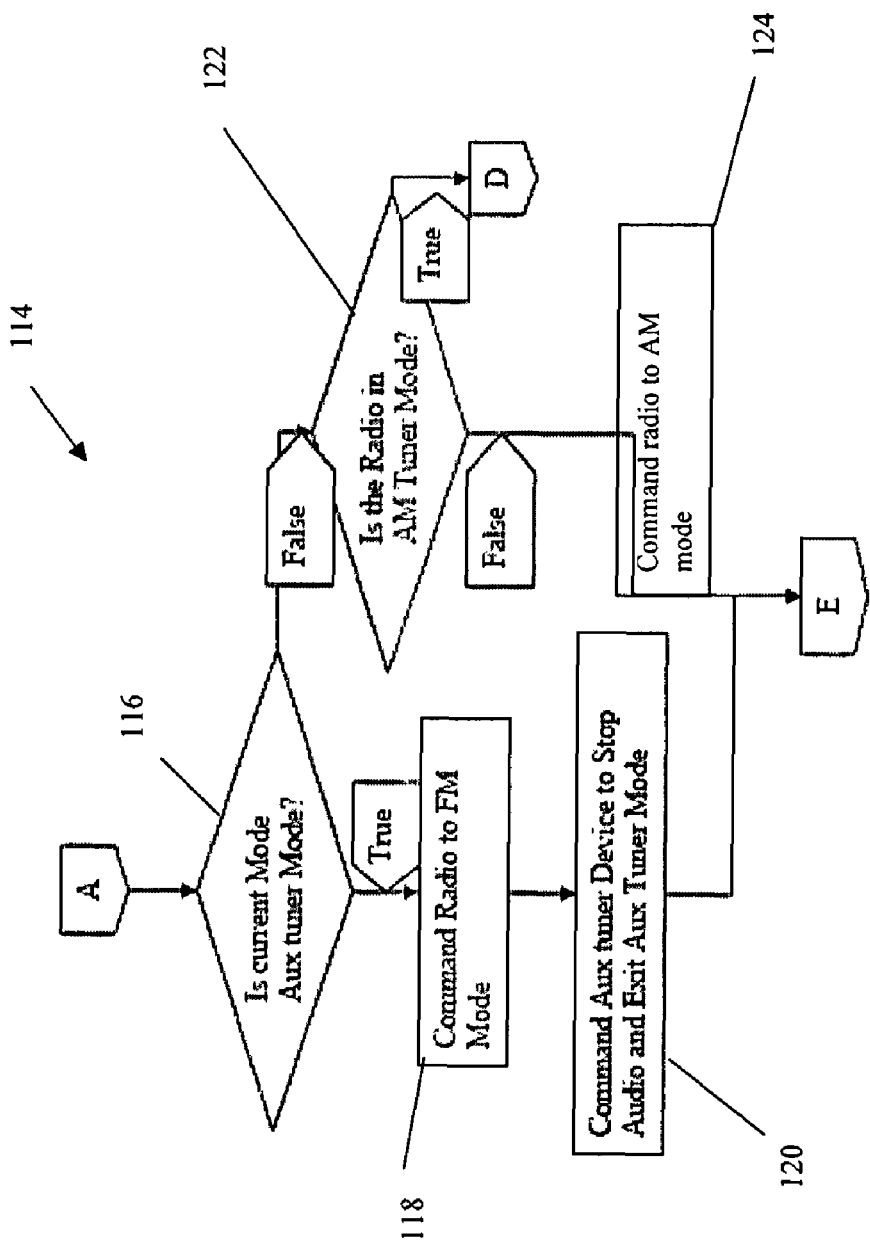
Figure 4:
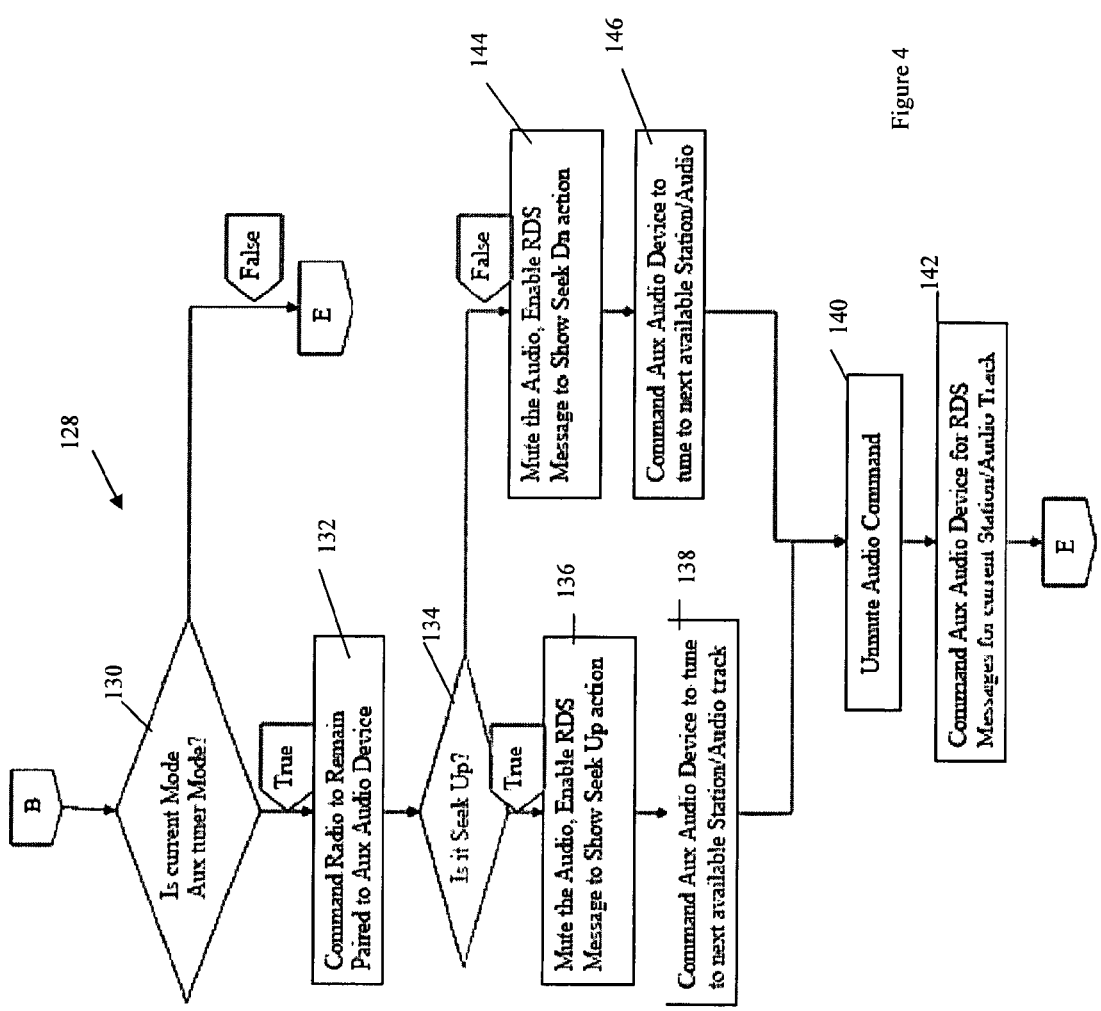
Figure 5:
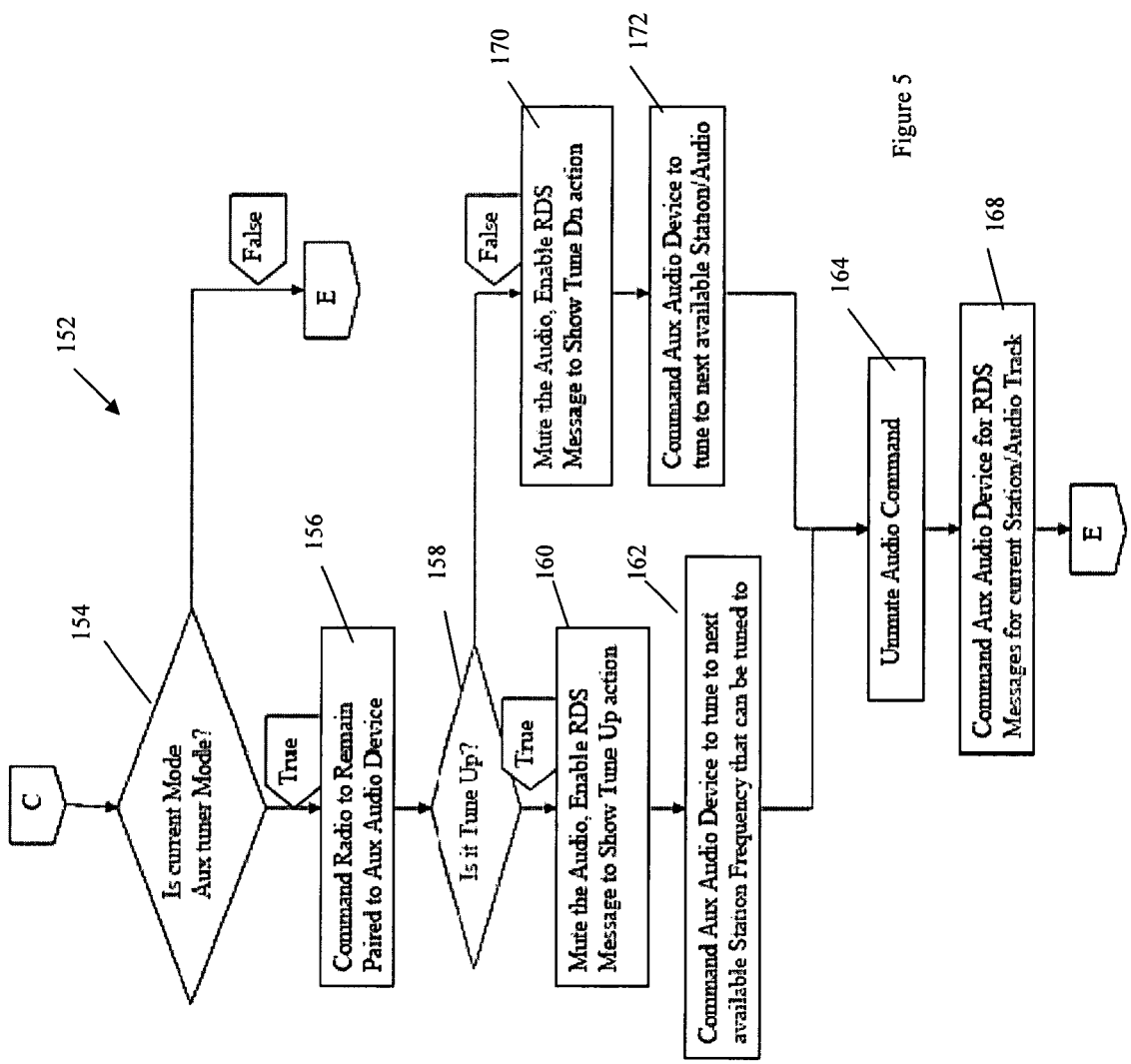
Figure 6:
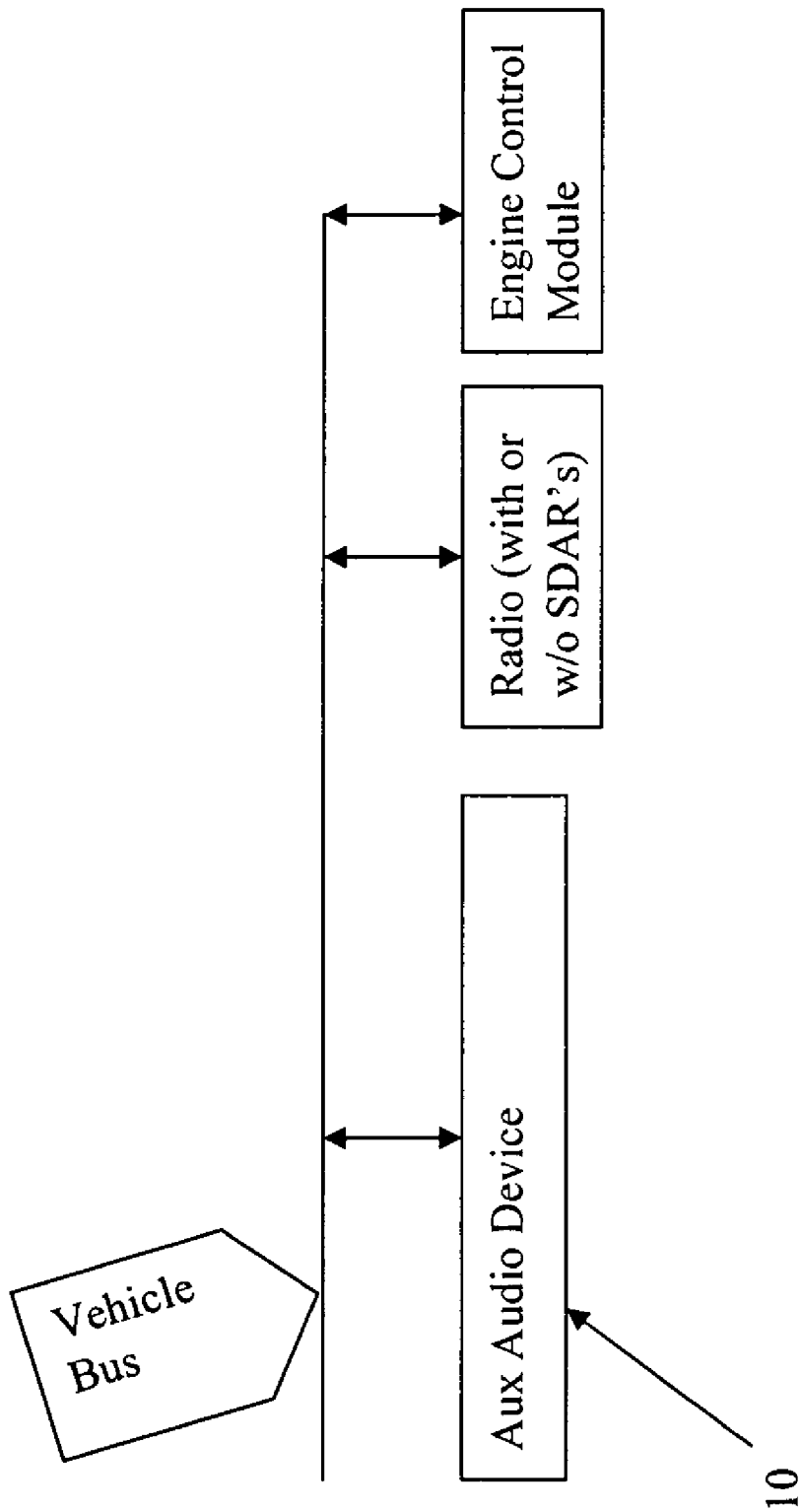
FIG. 6 is a schematic illustration of a system employing an exemplary embodiment of the present invention.

Disclosed herein is an apparatus and method for integrating an aftermarket system wherein consumer content can be provided through the vehicle's operating systems without the need for a second set of controls or removing an existing component and replacing it with the aftermarket system.

In accordance with exemplary embodiments of the present invention, the apparatus provides an interface for an aftermarket item wherein the same is integrated with the controls and displays of the vehicle system without providing and/or requiring an additional set of controls and displays. Non-limiting examples of aftermarket systems include; satellite radios, digital radio receivers, MP3 players, I-Pods, navigation systems (GPS), HD radio, etc.

In accordance with an exemplary embodiment of the present invention a vehicle interface is provided through the vehicle diagnostic link connector (DLC). Due to government mandates each vehicle produced for sale in the United States, for model years 1996 and afterwards, must have a diagnostic link connector. This connector is easily accessible and is intended for diagnostic scan tools to access the vehicle fault codes or other system performance parameters. Moreover, this connector is universal for all vehicles manufactured in the United States. In addition to the aforementioned uses, the DLC also provides a connection to the general vehicle system communication bus thereby providing access to many other vehicle systems; including vehicle systems controls, vehicle displays and vehicle status information. More specifically, the DLC provides communication to the vehicle audio or entertainment system (e.g., controls, displays, etc.). Physical transport layer protocols vary among vehicle manufacturers. There exist at least three known major protocols: GM Class II (J1850 VPW), Ford SAP (J1850 PWM) and Keyword 2000, also known as ISO-9141-2/14230.

Accordingly and in accordance with an exemplary embodiment, an aftermarket product designed to redistribute a SDARS or digital radio signal from an integral antenna of a digital radio receiver to an audio system of the vehicle is provided. In an alternative exemplary embodiment, the aftermarket product is also configured to receive and redistribute signals and data (e.g., audio or otherwise) from other devices such as an MP3 player, an I-Pod, a navigation system (GPS), etc.

In accordance with an exemplary embodiment of the present invention, an apparatus and method for a vehicle system interface is provided wherein the vehicle system interface device integrates an entertainment device with an existing audio system of the vehicle, wherein the entertainment device does not have or need direct controls or displays as the vehicle system interface allows the use of the pre-exiting vehicle controls and/or displays without need for rewiring or reprogramming the vehicle.

In accordance with an exemplary embodiment of the present invention, the vehicle system interface is easily installed within the vehicle by the end consumer without requiring any vehicle disassembly and/or re-wiring. In addition, the vehicle system interface also provides an enhanced optimization of the original equipment supplied on the vehicle as the vehicle system interface eliminates the need for a second set of controls as well as optimizes the existing controls of the vehicle.

In one exemplary embodiment redistribution of a SDARS or digital radio signal will be accomplished by taking the available S-band signal, decoding it to baseband audio and then FM modulating it and rebroadcasting it to the tuner of the vehicle audio system, wherein the audio content of the digital signal is provided.

In accordance with an exemplary embodiment of the present invention and in order to support the FM radio transmission of the audio data of the vehicle system interface, the FM transmitter of the vehicle system interface is set to a user selected transmit frequency, which in accordance with an exemplary embodiment is performed using the controls of the vehicle by sending the necessary command signals through the DLC connector to the vehicle system interface. In accordance with an exemplary embodiment the user selection is made such that the chosen broadcast frequency does not have strong competing FM broadcast signals from local radio and other radio stations capable of being received by the antenna of the vehicle radio. Thus, a user through implementation of a control algorithm of the vehicle system interface scans the available FM stations in order to find those that are free to use with the vehicle system interface. Then the FM transmitter of the vehicle system interface is set to one of the usable frequencies (e.g., no competing FM signal) and tunes the tuner of the car radio to this signal.

Referring now to FIG. 1, a schematic illustration of an exemplary embodiment of the present invention is provided. Here a vehicle system interface device 10 is illustrated. In accordance with an exemplary embodiment, the vehicle system interface device comprises a small compact housing with a connector configured to connect with a DLC connector of a vehicle. The vehicle interface device has an antenna 12. Antenna 12 is configured to receive a digital radio signal and transmit the same to a radio receiver circuit 14. The radio receiver circuit is configured to receive the digital radio signal of the antenna. The vehicle system interface device also has a FM audio modulator and transmitter circuit 16. The FM audio modulator and transmitter circuit is configured to condition and re-transmit the digital radio signal as a first re-transmitted FM signal containing audio data capable of being transmitted wirelessly. The vehicle system interface device also has a vehicle bus interface circuit 18 that is configured to receive and transmit a plurality of operational signals to and from the vehicle system interface device. In accordance with an exemplary embodiment the vehicle system interface device has a housing 20 for the FM audio modulator and transmitter circuit, the radio receiver circuit and the vehicle bus interface. The housing also has a connector 22 configured to interface with a diagnostic link connector 24 of the vehicle. In accordance with an exemplary embodiment the connector is in operable communication with the vehicle bus interface circuit, wherein the vehicle system interface receives and transmits the plurality of operational signals through the diagnostic link connector of the vehicle.

In accordance with an exemplary embodiment, the vehicle system interface is coupled to a diagnostic link connector of a vehicle. In accordance with an exemplary embodiment, the vehicle system interface has a uniform connector that is configured to connect with the diagnostic link connector of the vehicle. Once connected the vehicle system interface is able to receive and transmit control signals to and from the vehicle communication bus. In accordance with an exemplary embodiment the received control signals are generated by a user accessible input device, which as discussed herein can be steering wheel mounted controls; audio volume controls; and/or any selection controls integral with the existing vehicle systems wherein manipulation of the same causes a discernable signal to travel through the vehicle communications bus to the connector of the vehicle system interface device.

Once received by the vehicle communications device, a control algorithm resident upon the microprocessor will determine if the control signals are applicable to the operation of the vehicle system interface device (e.g., manipulation of radio selection or audio content control (volume up/volume down etc.)). If so, the control algorithm will manipulate an operational configuration of the vehicle system interface device, if necessary, and the vehicle system interface device will also transmit output signals and data to the vehicle communication bus via the connector, wherein the output signals and data correspond to a desired operational state of the vehicle system interface device and vehicle audio system. For example, if a tune up or tune down signal is received, the radio receiver circuit of the vehicle system interface will execute the channel tuning commands received through the DLC connector. Once the content channel has been changed, RDS data is transmitted to the vehicle audio system, one non-limiting example of this RDS data is: "Classical Music" or volume is now 5 of 10. In accordance with an exemplary embodiment, a data signal is also sent wherein graphical information is now sent to a display of the vehicle audio system and the aforementioned information is now provided.

In addition and in accordance with an exemplary embodiment, the vehicle system interface will also transmit the retransmitted FM signal containing audio data to an antenna of a radio of the vehicle wherein this data is played through the vehicle audio system.

In accordance with an exemplary embodiment of the present invention, the electronics of the vehicle system interface will receive its power supply through the diagnostic link connector of the vehicle. Thus, there is no requirement for an external power supply.

In accordance with an exemplary embodiment, a microprocessor 26 of the vehicle system interface is programmed to communicate with the vehicle communication bus. In accordance with an exemplary embodiment, the microprocessor is programmed via a universal serial bus (USB) port 28 wherein software updates may be provided in order to allow the vehicle system interface to communicate with any vehicle having a diagnostic link connector. For example, the vehicle system interface can be programmed to communicate with specific vehicles (e.g., make and model). This may be done via port 28 or during manufacture of the device.

In accordance with an exemplary embodiment, the vehicle system interface will comprise a microcontroller, microprocessor, or other equivalent processing device capable of executing commands of computer readable data or program for executing a control algorithm. In order to perform the prescribed functions and desired processing, as well as the computations therefore (e.g., the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present invention can be implemented through computer-implemented processes and apparatuses for practicing those processes.

Computer readable medium or data is stored in an internal hard drive or external hard drive shown in the dashed lines of FIG. 1. In the case of an MP3 player of an I-pod the stored data may be previously purchased digital recordings.

One non-limiting example of the operation of a control algorithm and the vehicle system interface will now be described. First the vehicle system interface must be programmed with the vehicle make and model to which it will be used in. This can be accomplished with either a PC-based application while connected to the device via the USB port or alternatively the device can be programmed via a device specific remote control. Alternatively, the device can be pre-programmed at the factory. Additional control behaviors can also be programmed into the device such as station presets, audio settings; FM modulator frequency etc. either by an initial programming or by user initiated programming using the control features of the vehicle after the vehicle system interface has been installed.

Once the device is installed in the vehicle by plugging it into the vehicle diagnostic link connector and connecting it to an SDAR antenna and a FM broadcast antenna it is ready to receive and transmit digital radio signals. In accordance with an exemplary embodiment, the digital signals being received by the SDAR antenna are configured for retransmission as FM signals via the FM broadcast antenna.

Once installed, the device sleeps in a low-power state until vehicle bus traffic is detected. At this point, the device wakes up and begins to listen on the vehicle communications bus. When a message is received by the device (by eavesdropping on the vehicle communications bus) signifying a user control has been activated, the device will then be triggered to react to affect the requested change in coordination with the vehicle entertainment system. For example, if the user presses the channel up button on the steering wheel, a control message is sent out on the vehicle serial bus as part of the standard vehicle behavior. The device listens for this message and when received changes the SDAR tuner accordingly. The device then initiates messaging with the vehicle radio to achieve the user intended change. In this example, such communication between the device and the vehicle radio is envisioned to include commanding the radio to tune to a given FM frequency, upon which the vehicle system interface device is transmitting audio, and providing a visual feedback to the user on the radio display.

In accordance with an exemplary embodiment of the present invention, a basic set of user controls and feedback can be achieved presuming that the vehicle can support the necessary bus messaging, control mechanisms and button presses. Typical capabilities of the vehicle system interface device in conjunction with the vehicle controls and displays may include but is not be limited to: channel up/down, cycling through a preset list of favorite channels, controlling the radio FM tuner, and displaying audio content metadata on the radio.

In cases where the vehicle bus does not report the necessary button pressed to control the vehicle audio system, a remote control may be substituted for command inputs.

Referring now to FIGS. 2-5, a flow chart illustrating portions of a control algorithm for executing a non-limiting exemplary embodiment of the present invention is illustrated wherein an external audio device is interfaced to a vehicle radio unit and radio steering wheel controls or other controls and radio buttons can be used to control the external audio device. For example, source, tune up/down and seek up/down actions can be performed from steering wheel controls or from radio head unit controls or controls at other locations within the existing vehicle systems.

Here a control algorithm 100 of the vehicle system interface is powered up and initialized at step 102. In accordance with an exemplary embodiment the control algorithm comprises machine readable code stored on a storage medium of the vehicle system interface. Thereafter, and at decision node 104 the algorithm determines if the radio head of the vehicle is in a radio tuner aux mode (e.g., interface device is coupled to vehicle audio system). If not, the system remains in the current state until a decision node 106 determines if the source is changed to the radio tuner aux mode. If not, the system remains at the current state (e.g., playing CD etc. (non-radio mode)) until a source change to radio tuner aux mode is received. Once a source change request to the radio tuner has been received the algorithm moves goes back to node 104. There, the answer at decision node 104 will now be true and the system at step 108 will pair the radio tuner to the interface device (e.g., radio now in aux tuner mode). Here at step 110 the interface device will start playing audio, which will be transmitted via the RF transmitter to the antenna of the vehicle audio system and RDS (Radio Data System) messages will be sent to the vehicle communication bus wherein information such as the current radio station, the song title and artist are displayed on the visual display of the vehicle.

Then at decision node 112 the algorithm determines if the "band button" has been depressed by listening to the signals on the vehicle communication bus. If decision node 112 determines that the band button has been depressed the subroutine 114 depicted in FIG. 3 will be run wherein a decision node 116 determines the current mode of the radio head of the vehicle namely, is the current mode the "aux tuner mode" wherein the RF transmitter of the interface device is transmitting to the tuner of the vehicle. If so, the algorithm at step 118 will command the radio tuner from "aux mode" to "FM mode" and then step 120 will command the vehicle interface device to stop transmitting audio and RDS messages. Then the algorithm returns to decision node 112.

If on the other hand, decision node 116 determines that the current mode of the radio tuner is not the "aux tuner mode" a decision node 122 determines if the current mode is "AM tuner mode" if so the algorithm returns to step 108 and the audio and RDS messages of the vehicle system interface are not provided to the vehicle audio system.

If on the other hand, decision node 122 determines that the current mode of the radio tuner is not the "AM tuner mode" step 124 commands the radio tuner to "AM mode" and the algorithm returns to step 108 and the audio and RDS messages of the vehicle system interface are not provided to the vehicle audio system.

Referring back now to FIG. 2 and if on the other hand decision node 112 determines that the band button has not been depressed, a decision node 126 determines if the "seek up/seek down" button has been depressed. If so, a subroutine 128 will be performed (FIG. 4) wherein a decision node 130 determines the current mode of the radio head of the vehicle namely, is the current mode the "aux tuner mode" wherein the RF transmitter of the interface device is transmitting to the tuner of the vehicle. If so, the algorithm at step 132 will command the radio tuner to remain paired to the vehicle interface device and a decision node 134 will determine if the signal was a "seek up" command. If so and at step 136, audio from the aux device (e.g., vehicle system interface) is muted and the RDS message sent to the vehicle bus shows a "seek up" action. Then at step 138 the aux device or vehicle system interface is commanded up to the next available station/audio track. Then at step 140 an un-mute command is transmitted and audio is once again transmitted wherein at step 142.

If on the other hand decision node 134 determines that a "seek down" command was received step 144 causes the audio from the aux device (e.g., vehicle system interface) to be muted and the RDS message sent to the vehicle bus shows a "seek down" action. Then at step 146 the aux device or vehicle system interface is commanded down to the next available station/audio track. Then at step 140 an un-mute command is transmitted and audio is once again transmitted wherein at step 142.

Referring back now to FIG. 2 and if on the other hand decision node 126 determines that the "seek up/seek down" button has not been depressed, a decision node 150 determines if the "tune up/tune down" button has been depressed. If so, a subroutine 152 will be performed (FIG. 5) wherein a decision node 154 determines the current mode of the radio head namely, is the current mode the "aux tuner mode" wherein the RF transmitter of the interface device is transmitting to the tuner of the vehicle. If so, the algorithm at step 156 will command the radio tuner to remain paired to the vehicle interface device and a decision node 158 will determine if the signal was a "tune up" command. If so and at step 160, audio from the aux device (e.g., vehicle system interface) is muted and the RDS message sent to the vehicle bus shows a "tune up" action. Then at step 162 the aux device or vehicle system interface is commanded up to the next available station frequency that the device can be tuned to. Then at step 164 an un-mute command is transmitted and audio and RDS signals are once again transmitted wherein at step 168.

If on the other hand decision node 158 determines that a "tune down" command was received step 170 causes the audio from the aux device (e.g., vehicle system interface) to be muted and the RDS message sent to the vehicle bus shows a "tune down" action. Then at step 172 the aux device or vehicle system interface is commanded to tune to the next available radio station. Then at step 164 an un-mute command is transmitted and audio is once again transmitted wherein at step 168.

Referring back now to FIG. 2 and if on the other hand decision node 150 determines that the "tune up/tune down" button has not been depressed a decision node 174 determines if a source has been changed. If so, the device is changed to a "non-aux tuner mode" at step 176. If on the other hand decision node 174 does not determine that the source has been changed the algorithm returns to decision node 112.

Accordingly, the aforementioned block diagram and the flow charts illustrate one non-limiting exemplary embodiment of how an aftermarket portable auxiliary audio device such as satellite radio (SDAR) can be interfaced to a vehicle entertainment system which may or may not be SDAR Capable. The portable device once connected to the vehicle bus through the commonly available vehicle interface connector, pairs automatically to the radio and once paired to radio, the vehicle radio becomes a SDAR radio with the control features of the vehicle radio unit like seek up/seek down acting in the same way for the SDAR's channel as for FM and AM bands of the radio. The aforementioned illustrate non-limiting exemplary embodiments of the present invention.

In another alternative exemplary embodiment, the vehicle system interface further comprises another aftermarket device such as an MP3 player, I-Pod, etc. and the audio content of this device is transmitted wirelessly through the FM audio modulator and transmitter circuit while associated RDS data is sent through the vehicle communication bus and the control algorithm of the device is configured to communicate with the vehicle communication bus similarly to the above mentioned embodiments in order to provide the data (audio and otherwise) of this device to the vehicle audio system. In yet another alternative embodiment, this device can replace the digital radio receiver circuit. Similarly and in yet another alternative embodiment, a global positioning system may be employed wherein data is transmitted to the vehicle through the vehicle system interface device using an appropriately configured algorithm.

As discussed, above and in order to support the FM radio transmission of the audio data of the vehicle system interface to a user selected transmit frequency, a control algorithm of the vehicle system interface is configured to send signals back and forth through the vehicle communications bus using the DLC connector to cause the tuner to scan for available frequencies and then once a usable frequency is found the tuner of the vehicle and the FM transmitter of the vehicle system interface are tuned to this frequency so that audio data can be transmitted wirelessly. In accordance with an alternative exemplary embodiment, the vehicle system interface is configured to cause the FM tuner of the vehicle audio device to scan for a usable frequency (e.g., no strong competing FM broadcast signals from local radio and other radio stations capable of being received by the antenna of the vehicle radio) and then setting the radio to this frequency and then causing the FM transmitter of the vehicle system interface to be set to this usable frequency. This would provide a quick and efficient means for synchronizing the vehicle system interface to the vehicle radio using the controls of the vehicle (e.g., no controls on the vehicle system interface). Thus and periodically, a user may simply input a command to scan for available frequencies, which tunes the vehicle radio and the FM transmitter of the vehicle system interface to the usable frequency. This may be manually achieved by simply pressing the controls on the vehicle steering wheel as they are now connected to the vehicle system interface via the DLC connector. This provides a quick and efficient means for retuning the radio and FM transmitter of the vehicle system interface especially if the vehicle has traveled to another location where the signals have changed. In yet another alternative, the algorithm can be configured to periodically and automatically issue commands to scan for available frequencies and, if necessary, re-tune the radio and FM transmitter to a more suitable frequency. In yet another alternative embodiment, the vehicle system interface can be configured to have a single button, which when depressed causes the algorithm to execute the aforementioned commands namely scanning for available frequencies, tuning the tuner to that frequency and tuning the FM transmitter of the vehicle system interface to the selected frequency.

Accordingly and in one exemplary embodiment, a low-cost aftermarket satellite receiver is provided via a small discrete housing unit that is configured to snap into the existing vehicle DLC bus wiring without requiring professional installation and the same makes use of displays and controls pre-existing in the vehicle entertainment system. This approach removes the need for many costly components of a typical aftermarket satellite radio such as the display, buttons, car dock and high cost decorative case materials.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle system interface, comprising:
    an antenna for receiving satellite or terrestrial broadcast of digital radio signals;
    a radio receiver circuit for demodulating and decoding the digital radio signals;
    a FM audio modulator and transmitter circuit, the FM audio modulator and transmitter circuit being configured to condition and re-transmit audio content of the digital radio signals as a first re-transmitted FM signal containing audio data capable of being transmitted wirelessly;
    a vehicle bus interface circuit configured to receive and transmit a plurality of operational signals;
    a housing for the FM audio modulator and transmitter circuit, the radio receiver circuit and the vehicle bus interface;
    a connector configured to interface with a diagnostic link connector of the vehicle, the connector being in operable communication with the vehicle bus interface circuit; and
    wherein the vehicle system interface receives and transmits the plurality of operational signals through the diagnostic link connector of the vehicle.

2. The vehicle system interface as in claim 1, wherein the housing further comprises a remote control interface circuit configured to receive command signals via an infrared or radio frequency transmission.

3. The vehicle system interface as in claim 1, wherein the housing further comprises a USB port.

4. The vehicle system interface as in claim 1, further comprising a microprocessor configured to execute a control algorithm of the vehicle system interface.

5. The vehicle system interface as in claim 1, wherein the vehicle system interface does not have any external controls.

6. The vehicle system interface as in claim 1, wherein the vehicle system interface does not have a visual display and the plurality of operational signals include RDS data related to the audio data and the RDS data is displayed on a graphical display of the vehicle.

7. A method for transmitting audio to a vehicle audio system, the method comprising:
    coupling a vehicle system interface to a diagnostic link connector of the vehicle, wherein the vehicle system interface does not have any external controls, the vehicle system interface comprising:
    an antenna being configured to receive a digital radio signal;
    a radio receiver circuit for receiving the digital radio signal of the antenna;
    a FM audio modulator and transmitter circuit, the FM audio modulator and transmitter circuit being configured to condition and re-transmit the digital radio signal as a first re-transmitted FM signal containing audio data capable of being transmitted wirelessly;
    a vehicle bus interface circuit configured to receive and transmit a plurality of operational signals;
    a housing for the FM audio modulator and transmitter circuit, the satellite radio receiver circuit and the vehicle bus interface;
    a connector configured to interface with the diagnostic link connector of the vehicle, the connector being in operable communication with the vehicle bus interface circuit; and receiving control signals from a vehicle communication bus, the control signals being generated by a user accessible input device;

determining if the control signals are applicable to the operation of the vehicle system interface;

manipulating an operational configuration of the vehicle system interface if the control signals are applicable to the operation of the vehicle system interface;

transmitting output signals and data to the vehicle communication bus via the connector, wherein the output signals and data correspond to an operational state of the vehicle system interface; and transmitting the first re-transmitted FM signal containing audio data to an antenna of a radio of the vehicle.

8. The method as in claim 7, wherein the user accessible input device is selected from the group comprising: steering wheel mounted controls; audio volume controls; and selection controls.

9. The method as in claim 7, wherein the housing further comprises a remote control interface circuit configured to receive command signals via an infrared transmission or radio frequency transmission.

10. The method as in claim 9, wherein the housing further comprises a USB port.

11. The method as in claim 7, further comprising a microprocessor configured to execute a control algorithm of the vehicle system interface.

12. The method as in claim 7, further comprising:
using existing controls of a vehicle system to manipulate an operational configuration of the vehicle system interface by coupling a control algorithm to the vehicle communication bus, wherein the control algorithm is coupled to the vehicle communication bus by the connector and the connector is configured to be coupled to the diagnostic link connector without any additional wiring steps.

13. A system for transmitting a digital radio signal to an audio system of a vehicle, the system comprising:
an audio device of the vehicle, the audio device comprising a FM tuner, a FM antenna and a display device;
a user accessible input device for providing control signals to the audio device via a vehicle communication bus;
a vehicle system interface configured to be coupled to the vehicle communication bus via a diagnostic link connector of the vehicle, wherein the vehicle system interface does not have any external controls, the vehicle system interface comprising:
an antenna to receive the digital radio signal;
a radio receiver circuit for receiving the satellite digital radio signal of the antenna;
a FM audio modulator and transmitter circuit, the FM audio modulator and transmitter circuit being configured to condition and re-transmit the digital radio signal as a first re-transmitted FM signal containing audio data capable of being transmitted wirelessly;
a vehicle bus interface circuit configured to receive and transmit a plurality of operational signals;
a housing for the FM audio modulator and transmitter circuit, the satellite radio receiver circuit and the vehicle bus interface; and
a connector configured to interface with the diagnostic link connector of the vehicle, the connector being in operable communication with the vehicle bus interface circuit.

14. The system as in claim 13, wherein the vehicle system interface further comprises a microprocessor having a storage medium encoded with machine readable computer program code for transmitting the digital radio signal to the vehicle audio system, the storage medium including instructions for causing the micropressor to implement a method comprising:
coupling the vehicle system interface to the diagnostic link connector of the vehicle;
receiving control signals from the vehicle communication bus, the control signals being generated by the user accessible input device;
determining if the control signals are applicable to the operation of the vehicle system interface;
manipulating an operational configuration of the vehicle system interface if the control signals are applicable to the operation of the vehicle system interface;
transmitting output signals and data to the vehicle communication bus via the connector, wherein the output signals and data correspond to an operational state of the vehicle system interface; and
transmitting the first re-transmitted FM signal containing audio data to an antenna of a radio of the vehicle.

15. The system as in claim 13, wherein the user accessible input device is selected from the group comprising: steering wheel mounted controls; audio volume controls; and selection controls.

16. The system as in claim 13, wherein the housing further comprises a remote control interface circuit configured to receive command signals via an infrared transmission.

17. The system as in claim 13, wherein the housing further comprises a USB port.

* * * * *